Nov. 10, 1953 R. MORRIS 2,658,761

SOUND REPRODUCING MACHINE

Filed April 19, 1948 2 Sheets-Sheet 1

Inventor
R. Morris
By [signature]
Attys.

Nov. 10, 1953 | R. MORRIS | 2,658,761

SOUND REPRODUCING MACHINE

Filed April 19, 1948 | 2 Sheets-Sheet 2

Inventor
R. Morris
By Glascock Downing & Seebold Attys.

Patented Nov. 10, 1953 2,658,761

UNITED STATES PATENT OFFICE 2,658,761

SOUND REPRODUCING MACHINE

Reginald Morris, Manchester, England

Application April 19, 1948, Serial No. 21,973

Claims priority, application Great Britain April 29, 1947

1 Claim. (Cl. 274—10)

This invention relates to machines which reproduce sounds from records having sound tracks on opposite sides.

Heretofore proposals have been made to enable reproduction to be made from the sound tracks at both sides of the record. These usually involve complicated means or devices for holding the record whilst reproduction of at least the track on the bottom of the record is being made. In one proposal, for example, the record is suspended from an expanding device inserted through the hole in the record, the device revolving the record. Such an arrangement lacks stability during reproduction. In another arrangement, the underside of a record is played whilst the latter is supported along with a magazine of records, the record being then released from the stack and falling on to a revolving platform where the upper side of the record is played. The direction of rotation of the record is reversed when its lower side is being played.

The object of the present invention is to provide an improved construction and arrangement of parts for facilitating the reproduction of both sides of a record.

The invention comprises the improved combination of parts hereinafter described and claimed.

Referring to the accompanying explanatory drawings.

Figure 1:
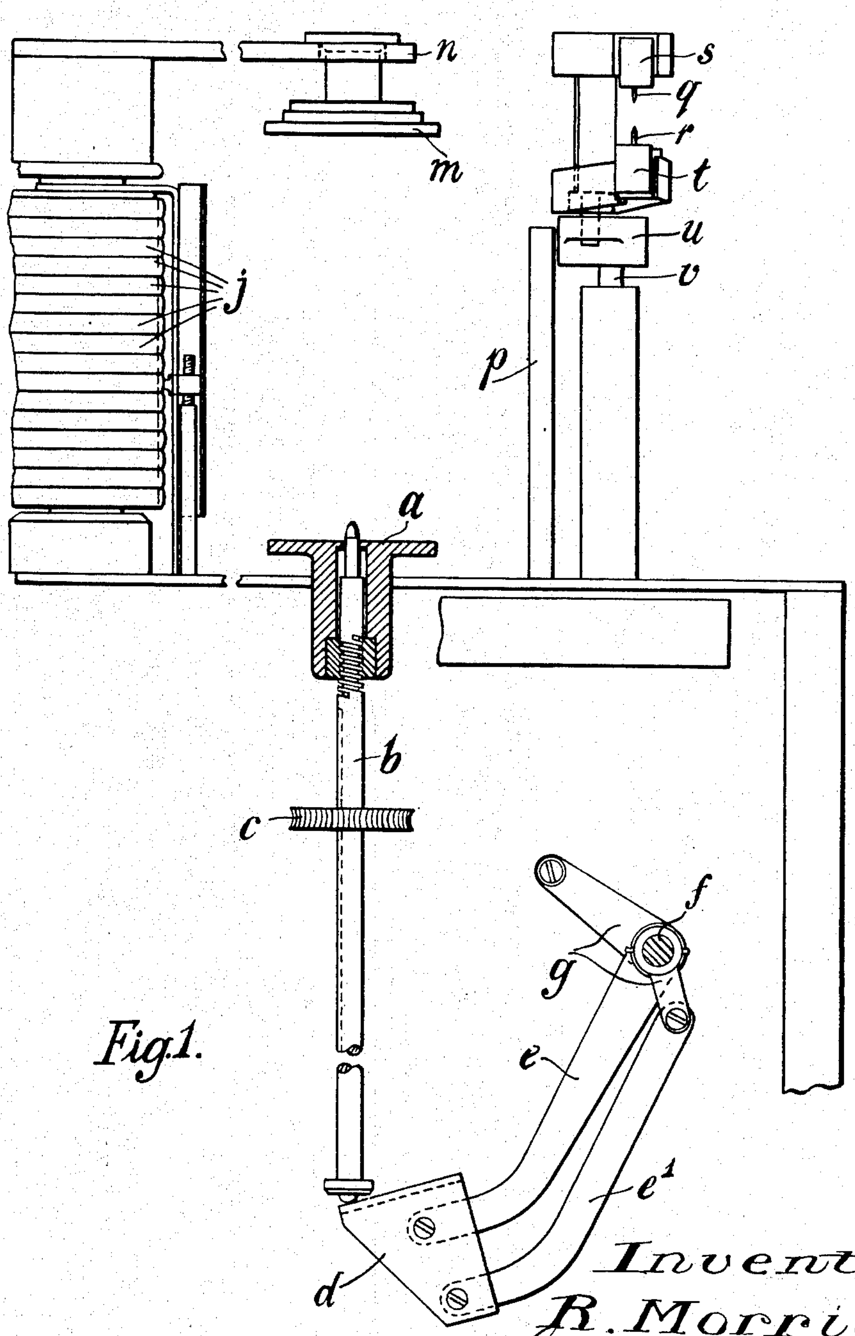
Figure 1 is a general view of the record carrying platform and the tone arms with the means for selecting which side of a record will be played, arranged in one convenient form in accordance with this invention.
Figure 2:
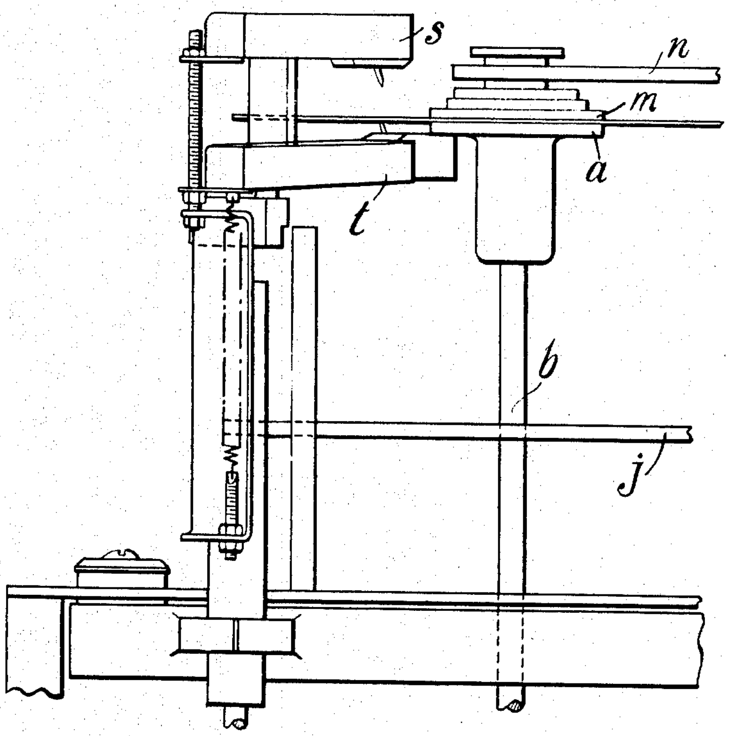
Figure 2 is a view taken from the opposite side of the machine to that shown in Figure 1, but with the record carrying platform in the position it occupies when the record it carries is in the playing position and the lower side of the record is being played.

The platform *a* is mounted on the upper end of a spindle *b* which has a worm wheel *c* feather keyed thereon, the lower end of the spindle being supported by a bracket *d* carried by an arm *e* turning freely about the pivot pin *f* and by a link $e^1$ connected to one arm of a lever *g* fulcrumed about the pivot *f*, the other arm of which is adapted to be engaged by a cam which serves to raise the platform *a* from its out of service position (shown in Figure 1) to its service position shown in Figure 2.

The records to be played are each carried in a ring like frame *j*, each of which can be turned in a known manner about a vertical spindle to move them from its out of service position shown in Figure 1 to a service position as shown in Figure 2. When a frame *j* is brought into its service position, it places its record co-axially above the platform *a* and co-axially beneath a weight *m* suspended from a bracket *n*. When the spindle *b* is raised, the platform *a* thereon engages the underside of the record in the frame *j*, raises the record clear of the frame and then presses the record against the weight *m* so as to support the latter clear of its supporting bracket *n*. The weight therefore clamps the record *o*, upon the platform so that the record and with it the weight *m* are revolved by the platform without slip. The diameters of the platform *a* and of the weight *m* are such that the sound tracks on the two sides of the record are exposed for reproduction.

A stop rod *p* ensures that each frame *j* is correctly located co-axial with the platform *a* when a record is brought into position to be lifted by the platform *a* clear of the frame to the playing position.

The two sides of the record when in the playing position are adapted to be engaged by either of two pick-ups *q* and *r*, one for each side of the record and the two pick-ups are carried by two tone arms *s* and *t* pivotally connected to a member *u* secured upon the upper end of a rod *w*. The latter is turned and raised or lowered by suitable means to put the pick-ups into and out of their service positions.

Figure 3:
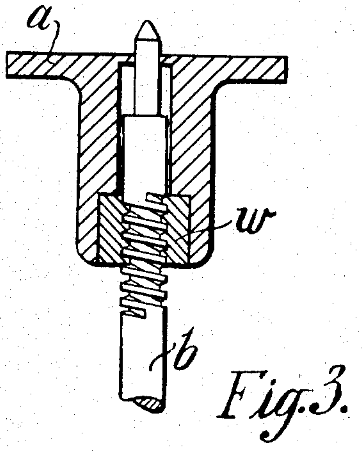
Figures 3 and 4 show the means for causing the record to be put into an appropriate position for engagement by the pick-up devices in accordance with the direction of rotation of the record.
Figure 4:
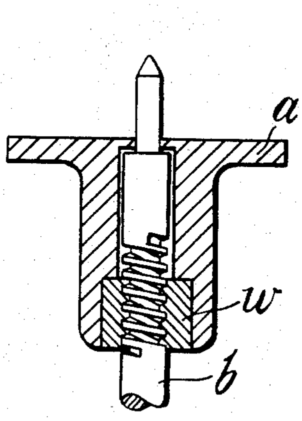

The platform *a* is not directly secured upon the spindle *b*, but as shown in Figures 3 and 4 the spindle *b* is threaded and the boss of the platform has a split nut *v* secured therein. With this arrangement, when the spindle *b* is turned in one direction, the platform *a* due to its inertia will travel down the spindle to the Figure 3 position before it is driven by the spindle, whilst when the latter is driven in the other direction, the platform will rise on the spindle to the Figure 4 position before it is driven by the spindle. With this arrangement, the spindle *a* raises the platform with the record until the record supports the weight *m*, then the spindle *a* is revolved in one or other direction and the platform goes higher or lower whilst still supporting the weight *m*. The tone arms *s* and *t* are swung in a known manner into the playing position before the spindle *a* is revolved. The record will then be raised or lowered by the screw and nut device so that the upper or the lower tone arm and its pick-up will be put in service. The weight *m* is of considerably elongated form to permit of the necessary amount of movement to be imparted to it.

The driving of the platform *a* may be by reversible electric motor with the switch mechanism operatively arranged so that the direction of rotation is appropriate to the position of the pick-up above or below the record.

What I claim is:

A sound reproducing machine comprising, in combination, a horizontal platform to carry a record whilst it is being played, a vertical spindle carrying the platform adapted to be revolved in both forward and reverse directions, a screw and nut connection between the platform and spindle so that according to the direction of rotation of the spindle the platform is raised or lowered before it is positively revolved by the spindle, a ring like support for a record mounted to turn about a vertical axis and to bring its record either above and in axial alignment with said platform or laterally clear thereof, a weight suspended above and in axial alignment with the platform, the latter when raised engaging the centre untracked part of the underside of the record and lifting it clear of its ring support, the record then engaging the weight and lifting it clear of its support so that the weight clamps the record on the platform and revolves with the platform and record, and pick-up means adapted to engage the upper and lower sides of the record.

REGINALD MORRIS.

References Cited in the file of this patent

UNITED STATES PATENTS

| Number | Name | Date |
|---|---|---|
| 1,404,870 | Mardonez et al. | Jan. 31, 1922 |
| 1,910,685 | Fisken | May 23, 1933 |
| 2,068,449 | Downs | Jan. 19, 1937 |
| 2,159,836 | Alm | May 23, 1939 |
| 2,214,913 | Vischer | Sept. 17, 1940 |
| 2,281,547 | Andrews | May 5, 1942 |
| 2,326,633 | Gabel | Aug. 10, 1943 |

FOREIGN PATENTS

| Number | Country | Date |
|---|---|---|
| 498,442 | Great Britain | Jan. 9, 1939 |
| 541,156 | Great Britain | Nov. 14, 1941 |